3,336,310
PRODUCTION OF MELAMINE FROM UREA
Guenther Hamprecht, Limburgerhof, Pfalz, Eberhard Rother, Ludwigshafen (Rhine), Matthias Schwarzmann, Limburgerhof, Pfalz, and Hermann Dieter Fromm, Ludwigshafen (Rhine), Germany, assignors to Badische Anilin- & Soda-Fabrik Aktiengesellschaft, Ludwigshafen (Rhine), Germany
No Drawing. Filed Apr. 16, 1965, Ser. No. 448,873
Claims priority, application Germany, Apr. 20, 1964, B 76,407
5 Claims. (Cl. 260—249.7)

This invention relates to the process for the production of melamine from urea and/or its thermal decomposition products, such as biuret and cyanuric acid, at atmospheric pressure. This process is based in principle on the reaction of mixtures of isocyanic acid and ammonia (formed by pyrolysis of the said substances) in contact with catalysts at temperatures of from 220° to 450° C. and in the presence of added ammoniacal gas. More particularly, the present invention relates to effective catalysts for this process.

All these methods have the great disadvantage that, particularly when working continuously, the reaction must always be carried out with the addition of pure ammonia. The added ammonia reappears in the off-gas from the reaction which consists mainly of carbon dioxide and ammonia. There is little or no possibility of this off-gas being utilized, particularly in the case of large-scale production, so that it is necessary to recover the ammonia from the off-gas by troublesome methods to make the process economical.

For this purpose, ammonia and carbon dioxide formed in the reaction may be separated as ammonium carbamate together with the melamine formed by cooling the off-gas and the excess ammonia may be returned to the reaction zone. Quite apart from the fact that it is very difficult to condense the ammonium carbamate and that glass-hard insulating layers, which are difficult to remove, are formed on the cooling surfaces of the condensers, this method has the great disadvantage that the melamine obtained is contaminated by large amounts of ammonium carbamate and has to be separated from it in a further operation.

Scrubbing out carbon dioxide from the off-gas is also very expensive because after the carbon dioxide scrubbing the gas must be freed from solvent vapor or, if aqueous alkali solutions have been used, must be dried before it can be returned to the reaction zone.

Many compounds have become known as catalysts for the synthesis of melamine from urea, and these are usually distinguished by a large internal surface, for example silicic acid gel, gels of the oxides of aluminum, titanium, zirconium or thorium, and also kaolin, bentonite, bauxite, diatomaceous earth or fuller's earth and also various types of active carbon, with or without additives. Substances have also been used which do not have a large internal surface, for example aluminum phosphate or boron phosphate. When using the most active catalysts, yields of pure melamine of about 70 to 90% are obtained and these are achieved only when the reaction is carried out in the presence of added pure ammonia. At least about 10 cubic meters (S.T.P.) of pure ammonia has to be supplied to the reaction zone for each kilogram of melamine formed. When the amount of ammonia is less, the yields obtained are lower; moreover the catalysts in this case become inactive after a short time so that continuous operation is not possible. The prior art catalysts lose their activity even more rapidly if the off-gas from the melamine synthesis, consisting mainly of ammonia and carbon dioxide, is used instead of pure ammonia. This decline in activity is due to compounds of poor volatility, for example melem, which are formed by a secondary reaction from melamine already formed and which are deposited on the catalysts. If the reaction be carried out in a stationary bed of catalyst, an increasing loss of pressure occurs owing to the deposition and this may even lead finally to complete clogging of the bed of catalyst. Some catalysts which have become inactive may be regenerated by treating them with pure ammonia at elevated temperatures. The activity of catalysts regenerated in this way does not however reach its original value. This loss in activity after each successive regeneration process is a serious disadvantage particularly when working continuously, because the intervals between individual regeneration processes during which the catalyst has adequate activity become increasingly shorter.

It is an object of the present invention to provide a catalyst for the said process for the production of melamine from urea and/or its thermal decomposition products at temperatures of from 300° to 450° C. with which these disadvantages can be avoided. This object can be achieved by using bohmite, bayerite or hydrargillite, which has been calcined at temperatures of 700° to 1,000° C., preferably 750° to 950° C., or a mixture of two or more of these compounds which has been calcined at the said temperature, as the catalyst.

Aluminum oxide catalysts treated in accordance with this invention surprisingly become coated with melem to an extremely small extent so that they retain their activity for a longer period than the prior art catalysts. An adequate increase in activity is achieved by calcination of the oxidic aluminum compounds for only about four hours, while no substantial further increase in activity can be observed after about sixty hours. It is advantageous to treat the said compounds at the said temperatures for from about twelve to forty-eight hours.

Catalysts treated according to this invention are distinguished, not only by the advantage that their activity is maintained over a long period, but particularly by the fact that either considerably smaller amounts of additional pure ammonia are necessary or the off-gas mixture obtained after melamine and urea have been separated may be used instead of pure ammonia. This procedure cannot be carried out with the prior art catalysts unless the disadvantage of obtaining a strongly contaminated crude melamine in poor yields can be tolerated. The catalysts according to the invention are also distinguished by the fact that their original activity is restored by regeneration with ammonia at elevated temperatures.

The following examples will further illustrate this invention.

*Example 1*

0.1 kg. per hour of granulated urea is introduced by means of a metering screw into a vaporizer heated to about 500° C. The off-gas consisting mainly of isocyanic acid and ammonia is mixed with 200 liters/hour of pure ammonia and passed through a reaction tube heated to 350° to 380° C. which is charged with 2 liters of catalyst. The layer of catalyst has a height of 1 meter. The catalyst consisting of γ-aluminum oxide which has been prepared by heating bohmite for twelve hours at 500° C. and which has an average particle diameter of 2 to 4 mm., has a bulk density of 483 g./l.

Melamine contained in the off-gas is separated in a cooled tube attached to the reactor. During the first five days, the melamine content of the crude product is about 95% but it then falls off rapidly so that the catalyst has to be regenerated after a reaction period of eight days.

During this eight-day period, a total of 5.32 kg. of crude product is obtained, containing 5.08 kg. of pure melamine, corresponding to a yield of 92.3% of the theory at a urea conversion of 98.4%.

The catalyst which has become inactive is regenerated for twenty-four hours at the reaction temperature by passing over it 400 liters per hour of pure ammonia, and it then has adequate activity for about another three to four days.

*Example 2*

A total of 18.1 kg. of granulated urea is introduced into a vaporizer as described in Example 1 and the cracked gas formed, mixed with 200 liters per hour of pure ammonia, is introduced into a reactor containing silica gel as catalyst. The catalyst which is present in a particle size of about 3 to 5 mm. has a bulk density of 434 g./l. a mean pore radius of 52.8 A., an internal surface of 317.0 sq. m./g., a total pore volume of 0.837 cubic meter per g. It also contains about 7% of water in the form of molecular water or OH— groups, 0.2% of $Na_2O$, 0.03% of $K_2O$ and 92% of $SiO_2$.

Crude melamine separated in the cooling tube has an average purity of about 98.5% after the first day. The quality of the product falls off day by day as shown in the Table 1.

TABLE 1

| Day | Content of melamine in percent in the crude product | Yield in percent of the theory |
|---|---|---|
| 1 | 98.5 | 71.9 |
| 2 | 96.4 | 84.8 |
| 3 | 90.6 | 86.6 |
| 4 | 90.0 | 87.0 |
| 5 | 81.6 | 86.9 |
| 6 | 79.4 | 87.5 |
| 7 | 77.9 | 90.2 |
| 8 | 70.0 | 86.0 |

It may be seen from the table that the melamine content of the crude product on the eighth day is only about 70.0%. During the experimental period of eight days, a total of 9.34 kg. of a crude product is obtained which contains 7.75 kg. of melamine, equivalent to a total yield of 87.5% of the theory.

*Example 3*

(A) As described in Example 1, 0.1 kg. of urea is vaporized per hour and passed through a stationary bed of catalyst. The catalyst used is an aluminum oxide which has been prepared by calcining bohmite containing bayerite for twelve hours at a temperature of 800° C. and which consists substantially of η-, γ-, ⊕- and δ-aluminum oxide. The catalyst has an internal surface of 123.0 sq. m./g., a mean pore radius of 111.4 A. and a total pore volume of 0.685 cubic meter per g. The catalyst, present as chippings having a particle diameter of 2 to 4 mm., has a bulk density of 535 g./l.

Melamine having a purity of about 95% is obtained for thirty-six days. Results of the experiment over a period of 168 days are given in the following Table 2. The columns have the following significance:

R=reaction period (including regeneration) in days
U kg.=amount of urea metered in, in kg.
CP kg.=crude product obtained, in kg.
CM percent=content of melamine in crude product in percent
PM percent=pure melamine in kg.
Y percent=yield in percent of the theory
PL=pressure loss in the bed of catalyst in mm. water-column

TABLE 2

| R | Kg. | | Percent | | | PL |
|---|---|---|---|---|---|---|
| | U | CP | CM | PM | Y | |
| 37 | 80.70 | 25.46 | 96.0 | 24.43 | 86.5 | 70 to 300. |
| 30 | 65.25 | 18.47 | 97.1 | 17.95 | 78.6 | 130 to 325. |
| 16 | 31.20 | 9.81 | 93.9 | 9.21 | 84.3 | 90 to 280. |
| 16 | 33.75 | 10.63 | 96.1 | 10.22 | 86.5 | 125 to 375. |
| 16 | 33.75 | 10.86 | 96.0 | 10.42 | 88.2 | 160 to 300. |
| 5 | 7.85 | 2.64 | 97.7 | 2.58 | 93.9 | 80 to 140. |
| 10 | 18.15 | 6.04 | 97.5 | 5.89 | 92.7 | 85 to 130. |
| 11 | 21.70 | 8.01 | 94.8 | 7.59 | 100.0 | 105 to 200. |
| 15 | 29.25 | 10.29 | 95.3 | 9.81 | 95.8 | 110 to 250. |
| 12 | 22.40 | 7.76 | 96.4 | 7.48 | 95.4 | 100 to 350. |

(B) By working as described under (A) with the difference that 300 liters of the off-gas freed from melamine and urea (consisting of about 2 parts by volume of ammonia and 1 part by volume of carbon dioxide) is returned to the reaction zone instead of pure ammonia, a crude product is obtained for twenty-eight days which contains about 90% of melamine. The catalyst is then regenerated as described in Example 1. The results of this experiment are shown in the following Table 3 which covers a total experimental period of seventy days. The headings to the columns in Table 3 have the same meaning as in Table 2.

TABLE 3

| R | Kg. | | Percent | | | PL |
|---|---|---|---|---|---|---|
| | U | CP | CM | PM | Y | |
| 29 | 61.70 | 22.45 | 90.2 | 20.24 | 93.7 | 85 to 300. |
| 13 | 27.0 | 9.79 | 89.7 | 8.78 | 92.9 | 100 to 410. |
| 13 | 25.6 | 9.45 | 87.0 | 8.22 | 91.7 | 110 to 460. |
| 15 | 29.25 | 11.00 | 88.1 | 9.70 | 94.8 | 90 to 310. |

*Example 4*

0.3 kg. per hour of granulated urea is introduced with 900 liters of a gas mixture of 1 part by volume of carbon dioxide and 2 parts by volume of ammonia into a fluidized bed reactor which is charged with 4 liters of the aluminum oxide catalyst described in Example 3(A) whose particle size however is 0.2 to 0.4 mm. The temperature in the reactor is 380° C. The cracked gas containing melamine is passed for completion of the reaction, into a second reactor which also contains 4 liters of the same catalyst and which is kept at a temperature of 350° C. Each of the fluidized beds in the two reactors has a height of 0.5 meter.

A total of 103 kg. of urea is reacted. By cooling the gas leaving the second reactor there is obtained, in a separator, 34.3 kg. of crude product which contains an average of 87.6% of melamine. After seventeen days, the catalyst is regenerated for twenty-four hours at a temperature of 390° C. while passing through 900 liters per hour of ammonia, another 1.2 kg. of 98% melamine thus being obtained. The catalyst thus regains it original activity.

We claim:

1. A process for the continuous production of melamine from urea at temperatures of from 300° to 450° C. in the presence of catalysts and added ammoniacal gas, wherein the catalyst used is an aluminum oxide which has been prepared by calcining a compound selected from the group consisting of bohmite, bayerite, hydrargillite or mixtures thereof at a temperature of from 700° to 1,000° C.

2. A process according to claim 1 wherein the thermal decomposition products of urea are used in place of urea.

3. A process as claimed in claim 1 wherein the catalyst is calcined at from 750° to 950° C.

4. A process as claimed in claim 1 wherein the reaction gas consisting substantially of ammonia and carbon dioxide obtained after removal of melamine is used as the ammoniacal gas.

5. A process as claimed in claim 1 wherein the catalyst is calcined for from twelve to forty-eight hours.

References Cited

UNITED STATES PATENTS 3,095,416  6/1963  Crowley et al. _____ 260—249.7
3,163,648  12/1964  Kaess et al. _____ 260—249.7

WALTER A. MODANCE, *Primary Examiner.*

JOHN M. FORD, *Assistant Examiner.*